(No Model.)
L. E. MANSFIELD.
CLUTCH MECHANISM.
No. 530,701. Patented Dec. 11, 1894.
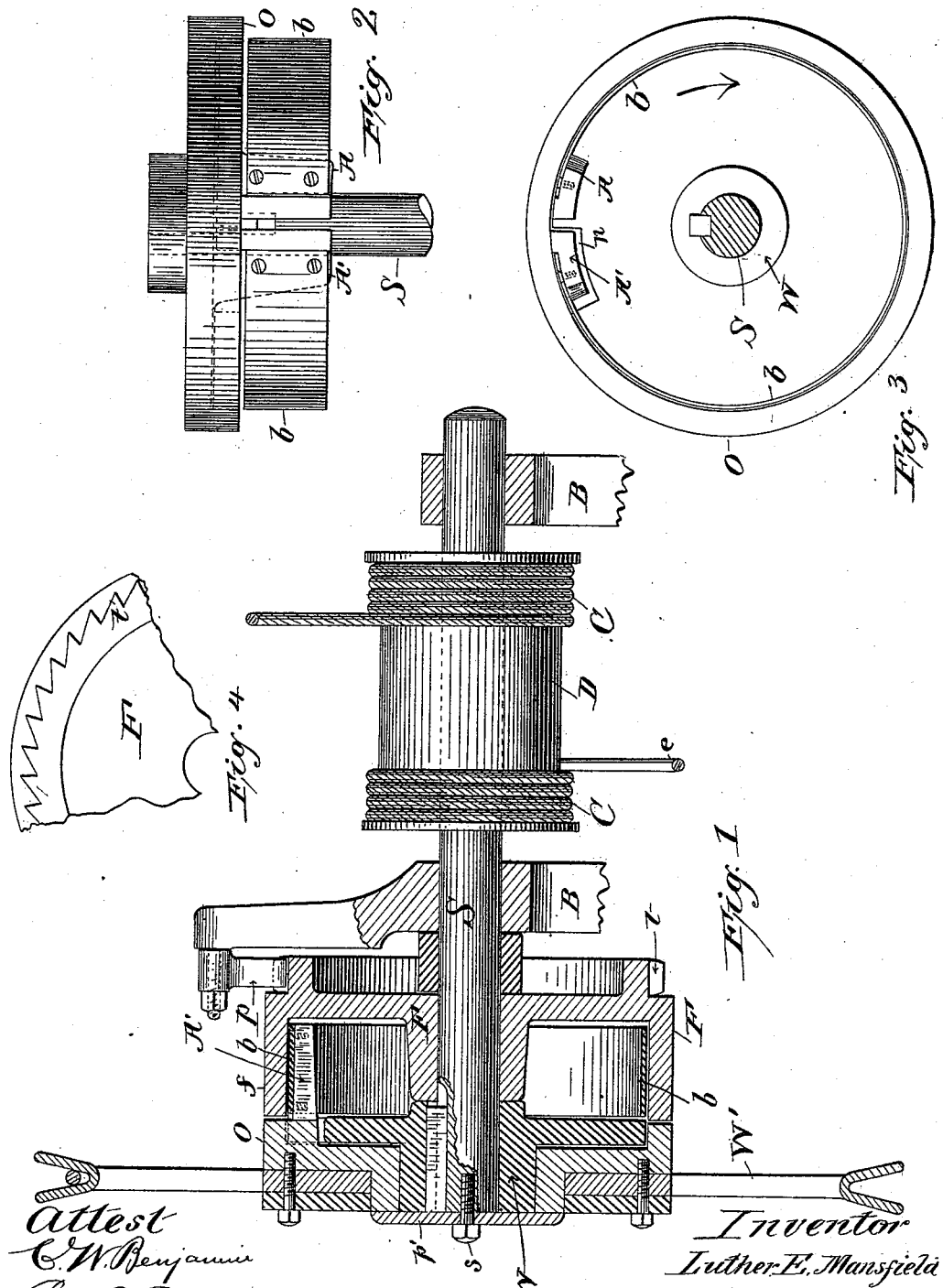
Attest
C. W. Benjamin
Peter B. Vermilye
Inventor
Luther E. Mansfield
by A. G. N. Vermilye
atty

UNITED STATES PATENT OFFICE.

LUTHER E. MANSFIELD, OF BROOKLYN, NEW YORK.

CLUTCH MECHANISM.

SPECIFICATION forming part of Letters Patent No. 530,701, dated December 11, 1894.

Application filed October 8, 1892. Serial No. 448,182. (No model.)

*To all whom it may concern:*

Be it known that I, LUTHER E. MANSFIELD, a citizen of the United States of America, and a resident of the city of Brooklyn, in the county of Kings and State of New York, have invented certain new and useful Improvements in Clutch Mechanisms, of which the following is a specification, reference being had to the accompanying drawings, forming part of the same, in which—

Figure 1, is a central vertical sectional view of such a mechanism, parts however of the apparatus being shown in full lines. Fig. 2, is an edge view of the friction band and the operating wheel. Fig. 3, is an inner face view of the connecting wheel, showing also the edge of the friction band and a part of the operating wheel, and Fig. 4, is a view of a portion of the friction wheel.

The object of my invention is to provide a clutch which may be attached to the shaft of a hoist, lift, elevator, dumb waiter, or analogous piece of machinery, and which when so attached will insure that such shaft will only turn at a speed proportioned to the speed of the operating portion, in whichever way that portion may be operated, and which will also hold the shaft at rest, when the operating portion is at rest. It thus acts as a stop at any point and yet leaves the entire mechanism free to be readily operated by the intended means, in either direction. The stop is always ready to act if the operator ceases to work the machinery and yet does not interfere at all with his so working it. Accidents are thus almost entirely avoided.

S, is the shaft supported in bearings B, B. It may, if desired, be provided with a drum D, upon which is coiled the supporting cable C, to which the weight (the car, or platform, or other device), is intended to be attached. Loosely carried upon this shaft is the friction wheel F, provided with ratchet-teeth $t$, adapted to be engaged by a pawl $p$, attached to an extension of bearing B, or some other fixed part. This wheel is provided with a crown, or drum $f$, the inner face of which is the friction bearing, and preferably with a hub, as shown.

Beyond wheel F, and upon shaft S, is rigidly secured a second wheel W, provided with an arm A, extending inwardly across the face of drum $f$, and upon the hub of wheel W, a third wheel, called the operating wheel O, is loosely supported, being held in place by a plate $p'$, secured by a screw $s$, extending into the end of the shaft. This wheel has an arm A', also extending inward across the face of drum $f$, and usually through a notch $n$, cut in the periphery of wheel W. The length of this notch is somewhat greater (generally by one fourth of an inch) than the width of arm A'. To these arms A, and A', a friction band $b$, is secured, one end to one arm and the other end to the other arm, the whole being disposed within the drum $f$, and of such a length as to almost equal the length of the interior face of said drum.

For convenience of operation and to give greater leverage wheel O, is usually provided with a larger wheel W', rigidly secured to it and grooved to permit the use of a rope, or chain, in operating it.

The operation is as follows: If a weight is attached to end $e$, of cable C, and the operator desires to raise it, he turns wheel O, (if arranged as shown in Fig. 1) toward him—that is, in a direction opposite to the arrow in Fig. 3. Then through band $b$, and wheel W, all secured together, he will turn shaft S, and coil cable C, upon the drum D, thereby raising the weight. When he starts, the motion of arm A', on wheel O, will be away from arm A, on wheel W, the diameter of the friction band will be enlarged and the said band will bind upon drum $f$, and thereby carry wheel F, with it, motion in that direction being permitted by pawl $p$. If the operator ceases to turn wheel O, the weight would tend to turn shaft S, and wheel W, in the opposite direction but this also would tend to enlarge the diameter of the friction band, causing it to bind upon drum $f$, and stop the shaft, as that drum and its wheel, can move in but one direction because of the engagement of teeth $t$, and pawl $p$. As will be manifest, movement of wheel O, toward the operator, or of the shaft and wheel W, in the opposite direction, each tend to engagement of the friction surfaces, by tending to separate the arms secured to the ends of the friction band, thereby enlarging the diameter of band $b$, and causing it to more closely fill the drum $f$. If however, the operator desires to lower the weight, or to turn shaft S, in the opposite direction, he turns wheel O away from him. This tends to bring the end of band $b$, secured to arm A', nearer to the end secured to arm A, thereby releasing the engagement of the friction surfaces, and through band $b$, arm A, and wheel W, pulling the shaft in the desired direction, but its movement can be no faster than the operator turns wheel O, otherwise arm A, on wheel W, would tend to separate from arm A', on wheel O, and the friction surfaces would immediately engage, and movement cease till the friction was relieved by the further movement of wheel O. It thus appears that the movement of the shaft is absolutely governed by the movement of wheel O.

What I claim, and desire to secure by Letters Patent, is—

1. The combination of a shaft, a pawl, a wheel mounted loosely upon said shaft, provided with ratchet teeth as set forth and an engaging surface, an operating part also loosely journaled upon said shaft, and an engaging band, connections between one end of said band and said shaft and connections between the other end of said band and the operating part, the engaging surface of said band being adapted to engage and release the engaging surface of the wheel, all substantially as set forth.

2. The combination of a shaft, a pawl, a wheel mounted loosely upon said shaft, provided with a friction surface and ratchet-teeth as set forth, an operating wheel also loosely mounted on said shaft and a friction band, connections between one end of said band and said shaft and connections between the other end of said band and the operating part, the friction surface being adapted to be moved toward and away from the friction surface of the wheel, all substantially as set forth.

3. The combination of a shaft, a pawl, a wheel loosely mounted thereon and provided with ratchet teeth and a friction surfaced crown extending from the face of said wheel and parallel to said shaft, an extension mounted rigidly upon said shaft and extending within and across the face of said crown, an operating wheel also loosely mounted upon said shaft and provided with an extension extending within and across the face of said crown and a friction band arranged within and having its face opposed to the inner face of said crown and its ends secured one to the extension rigidly secured to the shaft and the other to the extension extending from the operating wheel, all substantially as set forth.

In testimony that I claim the foregoing as my invention I have signed my name, in presence of two witnesses, this 6th day of October, 1892.

LUTHER E. MANSFIELD.

Witnesses:
A. T. FALES,
A. G. N. VERMILYA.